United States Patent [19]

Ogasawara

[11] 4,310,806
[45] Jan. 12, 1982

[54] DEVICE FOR DETECTING LINEAR DISPLACEMENT

[76] Inventor: Hiroomi Ogasawara, 3821-4, Yamakita, Yamakitamachi, Ashigarakami-Gun, Kanagawa-Ken, Japan

[21] Appl. No.: 86,370

[22] Filed: Oct. 18, 1979

[30] Foreign Application Priority Data

Oct. 20, 1978 [JP] Japan .................. 53-129314

[51] Int. Cl.³ .................. G01R 27/26; H03B 21/01
[52] U.S. Cl. .................. 331/40; 324/61 QS; 331/65; 340/870.37; 361/280
[58] Field of Search .................. 331/65, 37, 40; 324/61 R, 61 QS, 79 R, 79 D; 340/686, 870.37; 361/280, 283-285

[56] References Cited

U.S. PATENT DOCUMENTS

| 2,613,249 | 10/1952 | Babb |  |
|---|---|---|---|
| 2,675,540 | 4/1954 | Schultheis, Jr. | 340/539 |
| 3,140,450 | 7/1964 | Tavis | 331/40 |
| 3,221,256 | 11/1965 | Walden | 340/200 |
| 3,227,952 | 1/1966 | Proebster et al. | 324/79 R |
| 3,237,447 | 3/1966 | McKeown | 73/86 |
| 3,296,549 | 1/1967 | Johnson | 331/40 |
| 3,487,402 | 12/1969 | Hillhouse | 340/347 |
| 3,683,402 | 8/1972 | Parnell | 346/32 |
| 3,702,467 | 11/1972 | Melnyk | 340/200 |
| 3,723,866 | 3/1973 | Michaud et al. | 340/200 X |
| 3,860,918 | 1/1975 | Cencel | 340/200 |
| 3,879,660 | 4/1975 | Piso | 324/61 R |
| 3,938,077 | 2/1976 | Nakanishi et al. | 340/539 |
| 3,990,005 | 11/1976 | Abbe et al. | 324/61 R |
| 4,037,152 | 7/1977 | Griffith | 324/79 R |
| 4,227,182 | 10/1980 | Ogasawara et al. | 324/61 R X |
| 4,238,782 | 12/1980 | Ogasawara | 340/870.37 |

FOREIGN PATENT DOCUMENTS 213787 11/1966 Sweden .................. 331/37

Primary Examiner—Siegfried H. Grimm
Attorney, Agent, or Firm—Beveridge, DeGrandi, Kline & Lunsford

[57] ABSTRACT

A linear-moving type displacement detector has a movable electrode disposed between a pair of stationary electrodes such a manner that the electrodes are in parallel with one another, thus forming a pair of variable capacitors. The movable electrode is movable in a direction forming an angle with the stationary electrodes while being kept parallel with the stationary electrodes, so that one of the capacitances of the two capacitors is increased with the movement of the movable electrode, while the other is decreased, and vice versa. The capacitors are coupled to oscillators, the output frequencies of the oscillators are mixed in a mixer, to provide the difference frequency therebetween, or some analogous signal which is responsive to the difference frequency. The difference frequency or the analogous signal is utilized for displacement measurement.

8 Claims, 10 Drawing Figures 4,310,806

DEVICE FOR DETECTING LINEAR DISPLACEMENT

BACKGROUND OF THE INVENTION

This invention relates to a linear-moving type displacement detector.

A variety of linear-moving type displacement detectors are known in the art, by means of which a minute mechanical displacement is detected as an electrical signal. In one of these conventional linear-moving type displacement detectors, one movable electrode is disposed between one pair of stationary electrodes to form one pair of variable capacitors, and the two variable capacitors are combined with two oscillators. A mixer is utilized to provide the difference frequency between the output frequencies of the oscillators (cf. German Pat. No. 2,640,057, British Patent Application No. 37302/76, and Swiss Patent Application No. 11367/76).

SUMMARY OF THE INVENTION

An object of the present invention is to improve the above-described linear-moving type displacement detector.

More specifically, an object of the invention is to provide a linear-moving type displacement detector in which the direction of movement of a movable electrode is at an angle with respect to the stationary electrodes, so that the change of the relative distance between the movable and stationary electrodes is small when compared with the rate of movement of the movable electrode, thereby permitting displacement measurement over a wider displacement range.

The foregoing object and other objects of the invention have been achieved by the provision of a linear-moving type displacement detector comprising: detector means having at least one movable electrode between at least one pair of stationary electrodes in such a manner that the electrodes are parallel with one another, the movable electrode being movable in a direction forming a predetermined angle of the stationary electrodes while being maintained parallel with the stationary electrodes, thus forming at least one set of variable capacitors whose capacitances vary in such a manner that one capacitance is increased with the movement of the movable electrode while the other capacitance is differentially decreased; one pair of oscillators in which the one set of variable capacitors in the detector means are incorporated; mixer means for providing a frequency difference signal between the outputs of the two oscillators; and converter means for converting the output of the mixer means into a desired type of signal.

The nature, principle and utility of the invention will become more apparent from the following detailed description and the appended claims when read in conjunction with the accompanying drawings, in which like parts are designated by like reference characters.

DETAILED DESCRIPTION OF THE INVENTION

First of all, the fundamental arrangement of a linear-moving type displacement detector according to this invention will be described with reference to FIG. 1(a) and FIG. 1(b).

Figure 1A:
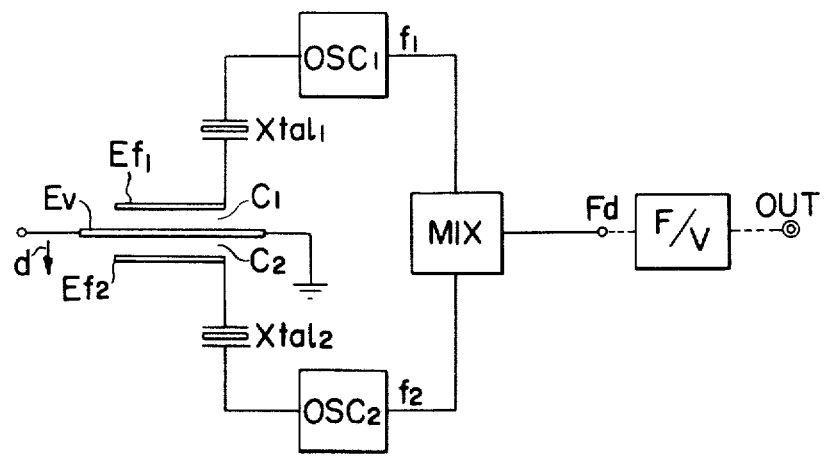
FIG. 1(a) and FIG. 1(b) are explanatory diagrams, partly as block diagrams, useful for a description of the principle of this invention.
Figure 1B:
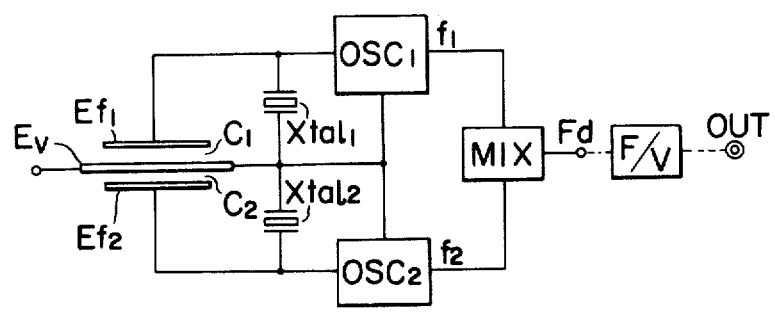

The displacement detector, as shown in FIG. 1(a) and FIG 1(b) comprises a movable electrode Ev and a pair of stationary electrodes Ef1 and EF2 provided on both sides of the movable electrode Ev, so that a variable capacitor $C_1$ is formed by the movable electrode Ev and the stationary electrode Ef1 and a variable capacitor $C_2$ is formed by the movable electrode Ev and the stationary electrode Ef2. Accordingly, if the movable electrode Ev is moved in the direction of the arrow d, the capacitance of the capacitor $C_1$ is decreased while the capacitance of the capacitor $C_2$ is increased, and vice versa. That is, the increase and decrease of these capacitances are in approximately inverse proportion to the distances between the movable electrode Ev and the stationary electrodes Ef1 and Ef2.

In FIG. 1(a), the two capacitors $C_1$ and $C_2$ are series-connected to crystal resonators $Xtal_1$ and $Xtal_2$ which are connected to oscillators $OSC_1$ and $OSC_2$, respectively. On the other hand, FIG. 1(b) shows that two capacitors $C_1$ and $C_2$ are connected in parallel to crystal resonators $Xtal_1$ and $Xtal_2$, respectively. The employment of the crystal resonators is to stabilize the oscillation frequencies. The outputs of the two oscillators $OSC_1$ and $OSC_2$ are applied to a mixer MIX, which provides a difference frequency signal Fd indicative of the difference in frequency between the outputs of the two oscillators. The difference frequency signal Fd is applied to, for instance, a frequency-voltage converter F/V to obtain a voltage signal at an output terminal OUT.

Figure 2A:
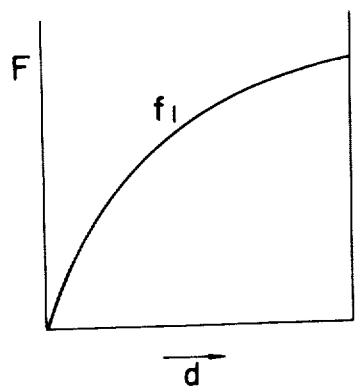
FIG. 2(a), FIG. 2(b), FIG. 3(a), and FIG. 3(b) are graphical representations useful for a description of the operation of the device shown in FIG. 1.
Figure 2B:
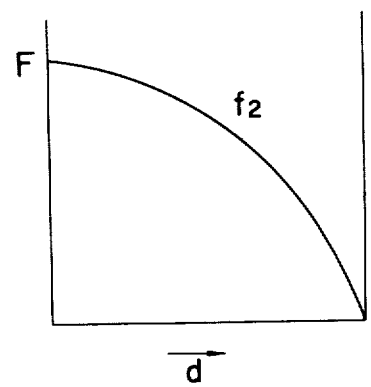

FIG. 2(a) and FIG. 2(b) are graphical representations indicating the variation characteristics of the output frequencies $f_1$ and $f_2$ of the oscillators $OSC_1$ and $OSC_2$ with the stroke d of the movable electrode Ev, respectively. As is apparent from these graphical representations, as the movable electrode Ev leaves the stationary electrode Ef1 and accordingly approaches the stationary electrode Ef2, the capacitance of the capacitor $C_1$ is gradually decreased while the capacitance of the capacitor $C_2$ is gradually increased, and the output frequencies of the oscillators $OSC_1$ and $OSC_2$ are gradually increased and decreased similarly.

Figure 3A:
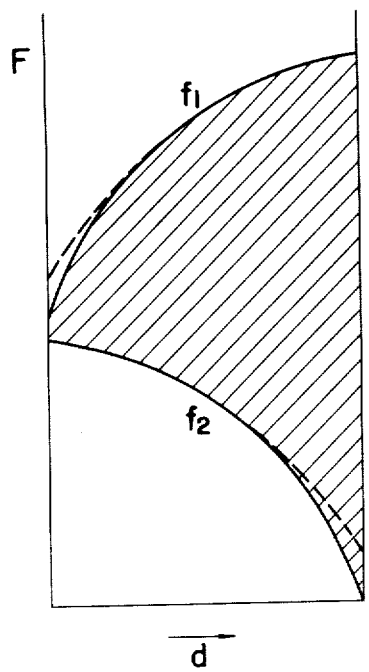
Figure 3B:
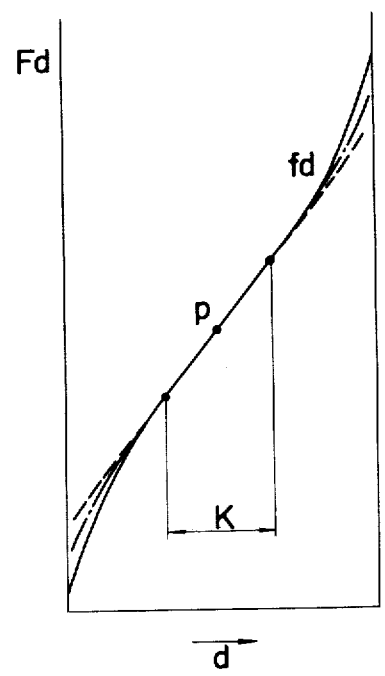

FIG. 3(a) and FIG. 3(b) are graphical representations indicating the operating characteristic of the mixer MIX, useful for a description of the operation of providing the difference Fd between the outputs $f_1$ and $f_2$ of the oscillators $OSC_1$ and $OSC_2$. It should be noted that the characteristic curves of the outputs $f_1$ and $f_2$ are non-linear; however, they are symmetrical with each other. Accordingly, if a curve representative of the difference ($f_1-f_2$) is plotted, then the curve has a middle part which is substantially a straight line and both end parts which are moderately curved; that is, the curve is S-shaped as shown in the FIG. 3(b). Therefore, the use of the linear part K of the characteristic curve can provide a frequency output which varies linearly with the stroke d of the movable electrode.

Figure 4:
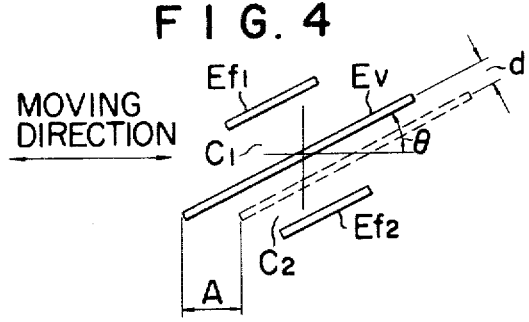
FIG. 4 is an explanatory diagram showing the arrangement of an electrode section in one example of a linear-moving type displacement detector according to this invention.

FIG. 4 shows the arrangement and operation of an electrode section of one example of the linear-moving type displacement detector according to the invention. In this example, the movable electrode Ev is maintained parallel with the stationary electrodes Ef1 and Ef2 while it leaves, for instance, the stationary electrode Ef1 and accordingly approaches the stationary electrode Ef2, whereby the degree of capacitance variation of each variable capacitor is decreased and the detection range is increased.

More specifically, the electrode section is so designed that while the movable electrode Ev is being maintained parallel with the two stationary electrodes Ef1 and Ef2, the movable electrode Ev is movable in a direction forming a predetermined angle with the two stationary electrodes Ef1 and Ef2. Accordingly, if the amount of movement of the movable electrode Ev is represented by A, then the effective amount of movement d in the variable capacitor is:

$$d = A \sin \theta$$

Therefore, if the angle $\theta$ is of the order of 5.74°, then the value d is about 1/10 of the amount of movement A. Thus, the amount of movement of the variable electrode can be greatly increased when compared with an electrode section in which the movable electrode is moved perpendicularly to the stationary electrodes, under the condition that in both cases the capacitance of the variable capacitor is equally changed.

Figure 5A:
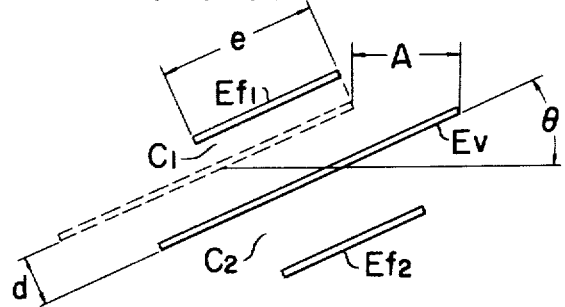
FIG. 5(a) and FIG. 5(b) are also explanatory diagrams showing the arrangement of an electrode section in another example of the linear-moving type displacement detector according to the invention.
Figure 5B:
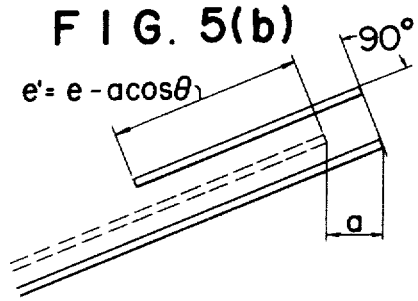

FIG. 5(a) and FIG. 5(b) show another example of the linear-moving type displacement detector according to the invention. The specific feature of this example resides in that the length e of each of the stationary electrodes Ef1 and Ef2 is made to be shorter than that of the movable electrode Ev so as to improve the S-shaped characteristic curve in FIG. 3(b) into a substantially linear characteristic curve. In FIG. 5(a), if the movable electrode Ev is moved by A, then the capacitance of the capacitor $C_1$ is increased. If the movable electrode Ev is further moved toward the stationary electrode Ef1 by a as shown in FIG. 5(b), then the effective electrode area is decreased to e'/e, which negatively affects the capacitance increasing rate of the capacitor $C_1$.

Figure 6:
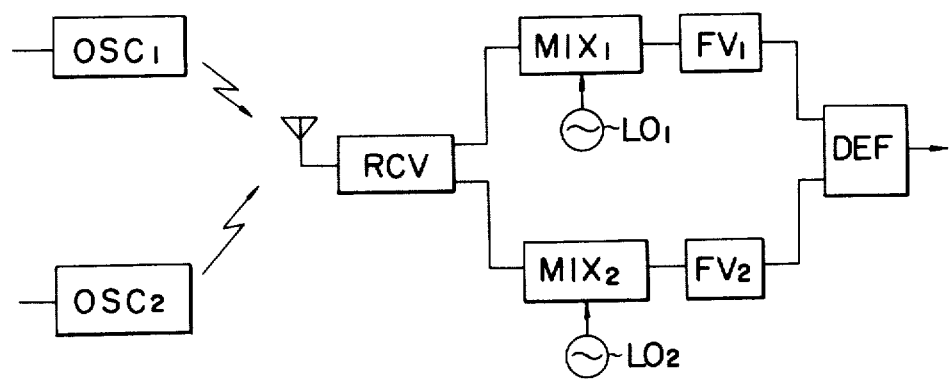
FIG. 6 is a block diagram showing another method of processing the outputs of the oscillators in the linear-moving type displacement detector according to the invention.

FIG. 6 shows another method of processing the outputs of the oscillators $OSC_1$ and $OSC_2$. In this method, the outputs of the oscillators are transmitted by radio wave. More specifically, the outputs of the oscillators are received by a receiver RCV and are applied to mixers $MIX_1$ and $MIX_2$, respectively, in which the outputs are mixed with local oscillation frequencies $LO_1$ and $LO_2$ for frequency conversion to provide two output signals, respectively.

Each of the two output signals of the mixers is applied to frequency-voltage converters $F/V_1$ and $F/V_2$ so that each of the signals is converted to voltage signals. The voltage signals are applied to a differential amplifier DIF to provide a voltage difference signal which represents the frequency difference between oscillators $OSC_1$ and $OSC_2$.

The method can solve the following problems. One of the problems is that if the output frequency difference of the oscillator $OSC_1$ and $OSC_2$ is several kilo-Hertz (KHz), then the signal interval is about 0.2 to 0.3 milli-second, and accordingly the measurement cannot follow a quickly moving object. Another problem is that, although the most readily obtainable output frequency of each of the oscillators $OSC_1$ and $OSC_2$ is 10 to 20 MHz with a crystal resonator, the frequency is excessively high in the case where the output is applied to a frequency-voltage converter simpler than that in FIG. 1 to provide a voltage signal.

However, as a result of the frequency conversion according to the invention, the signal interval is in the order of microseconds, and several KHz which is the signal variation component is not included in the range of error. Thus, a measurement signal which is excellent in response characteristic and can be readily handled can be obtained.

As is apparent from the above description, in the present invention, the movable electrode is disposed between one pair of stationary electrodes in such a manner that the movable electrode is parallel with the stationary electrodes, and while the movable electrode is being maintained parallel with the stationary electrodes, the movable electrode is moved in a direction forming a predetermined angle with the stationary electrodes. Accordingly, even if the amount of movement of the movable electrode is made large, the variations in capacitance of the variable capacitors formed by the three electrodes are small, whereby the variation detection range can be increased.

Furthermore, the output linearity can be improved by suitably determining the length of at least one of the movable and stationary electrodes so that the electrode area is affected thereby.

What is claimed is:

1. A device for detecting linear displacement of an object comprising:
   (a) a sensor including a first electrode; a pair of second electrodes spaced apart in parallel relation and having said first electrode therebetween, parallel therewith and spaced from a first one of said pair by a first distance and from the other one of said pair by a second distance to form therewith a pair of capacitors; and means responsive to linear displacement of the object for moving one of (i) said first electrode and (ii) said pair of second electrodes with respect to the other thereof by a distance A and in a direction forming an angle $\theta$ with respect to said parallel electrodes, to vary the first distance and the second distance differentially by an amount equal to $A \sin \theta$ so that as the object is linearly displaced the capacitance of one of said capacitors increases while the capacitance of the other of said capacitors correspondingly decreases differentially;
   (b) two oscillator circuits, each having an associated one of said capacitors incorporated therein as a frequency varying component; and
   (c) mixer means connected to said two oscillator circuits for providing a frequency difference signal determined by the difference in the frequencies of said two oscillator circuits and indicative of the extent of linear movement of the object.

2. A device as claimed in claim 1 further comprising conversion means for converting the frequency difference signal into a signal of a desired type.

3. A device as claimed in claim 2, in which said first electrode is of a different size than each of said pair of second electrodes so that after a given amount of relative movement therebetween in said direction, said first electrode confronts, only a part of one of said pair of second electrodes during further movement in said direction.

4. A device as claimed in claim 1 in which said first electrode is adapted to move in response to linear movement of the object and said pair of second electrodes is stationary.

5. A device as claimed in claim 1 in which said pair of second electrodes is adapted to move in response to linear movement of the object and said first electrode is stationary.

6. A detector as claimed in claim 1 further comprising means for transmitting the outputs of said oscillators by radio wave.

7. A detector as claimed in claim 1 in which said mixer means comprises a mixer unit, a source of local oscillation frequencies connected to said mixer unit for mixing with the outputs of said oscillators to provide frequency converted signals, and means for obtaining a difference frequency signal indicative of the difference between the frequencies of the frequency converted signals.

8. A device as claimed in claim 1 in which $\theta$ is an angle in the order of 5.74°.

* * * * *